US007037550B2

(12) United States Patent
Liu et al.

(10) Patent No.: US 7,037,550 B2
(45) Date of Patent: May 2, 2006

(54) SPRAYABLE COOKWARE RELEASE COMPOSITION WITH FRACTIONATED OIL AND METHOD OF PREPARING FOOD ITEM

(75) Inventors: Linsen Liu, Irvine, CA (US); Barry L. Geiger, Danville, PA (US)

(73) Assignee: ConAgra Grocery Products Company, Irvine, CA (US)

( * ) Notice: Subject to any disclaimer, the term of this patent is extended or adjusted under 35 U.S.C. 154(b) by 132 days.

(21) Appl. No.: 10/447,078

(22) Filed: May 28, 2003

(65) Prior Publication Data

US 2004/0241291 A1 Dec. 2, 2004

(51) Int. Cl.
*A23P 1/08* (2006.01)
*A23D 9/013* (2006.01)

(52) U.S. Cl. ...................... 426/609; 426/662; 426/811; 554/80; 106/8; 106/9

(58) Field of Classification Search ................ 426/811, 426/602, 609, 662
See application file for complete search history.

(56) References Cited

U.S. PATENT DOCUMENTS 2,796,363 A 6/1957 Lalone
3,661,605 A 5/1972 Rubin et al.
3,821,007 A 6/1974 Carey
3,896,975 A 7/1975 Follmer
4,023,912 A 5/1977 Mahler et al.
4,066,817 A 1/1978 DeRossi
4,073,411 A 2/1978 Doumani
4,108,678 A 8/1978 Szuhaj et al.
4,142,003 A 2/1979 Sejpal
4,155,770 A * 5/1979 Doumani .................... 106/267
4,163,676 A 8/1979 Konigsbacher
4,188,412 A 2/1980 Sejpal
4,192,898 A 3/1980 Hanson, Sr.
4,371,451 A 2/1983 Scott et al.
4,425,164 A 1/1984 Bliznak et al.
4,479,977 A 10/1984 Dashiell et al.
4,547,388 A * 10/1985 Strouss ....................... 426/609
4,849,019 A 7/1989 Yasukawa et al.
5,156,876 A 10/1992 Clapp et al.
5,211,317 A 5/1993 Diamond et al.
5,296,021 A 3/1994 Clapp et al.
5,362,892 A 11/1994 Umeda et al.
5,370,732 A 12/1994 Follmer
5,374,434 A 12/1994 Clapp et al.
5,455,055 A * 10/1995 Stoltz ......................... 426/115
5,468,507 A * 11/1995 Czap .......................... 426/99
5,503,866 A 4/1996 Wilhelm et al.
5,567,456 A 10/1996 Clapp et al.
5,650,185 A 7/1997 Stoltz
5,662,956 A 9/1997 Knightly
5,874,117 A 2/1999 Sundram et al.
6,123,977 A 9/2000 Diamond
6,210,743 B1 4/2001 Clapp et al.
6,365,211 B1 * 4/2002 Corrigan ..................... 426/116
6,365,558 B1 4/2002 Lal
6,403,144 B1 6/2002 El-Khoury et al.
6,414,172 B1 7/2002 Garces et al.
6,749,874 B1 * 6/2004 Paul et al. .................. 426/115
6,905,722 B1 * 6/2005 Liu ............................ 426/609
2003/0211222 A1 * 11/2003 Paul et al. .................. 426/609

FOREIGN PATENT DOCUMENTS

EP 0591258 B1 9/1997
EP 0594258 B1 7/1999
JP 60091939 A 5/1985
JP 61-44120 10/1986
JP 01-262753 10/1989
JP 01-262754 10/1989
JP 4-283410 9/1992
JP 11-262358 9/1999
JP 2002-238453 8/2002

OTHER PUBLICATIONS

"Nutritional Foods Spray the Fat"; Food Industries of South Africa Sep. 1995; vol. 48, No. 9, p. 14.
T. P. Pantzaris: "Pocketbook of Palm Oil Uses";Malaysian Palm Oil Board, Ministry of Primary Industries, Malaysia; Fifth Edition, Sep. 2000; Tables 7, 11, 12, 15, 16 and 17 (3 pages).

* cited by examiner

*Primary Examiner*—Carolyn Paden
(74) *Attorney, Agent, or Firm*—Bingham McCutchen LLP

(57) ABSTRACT

A sprayable cookware release composition includes a cookware release agent, a fractionated oil, such as a fractionated palm oil or a fractionated coconut oil, and a propellant. A combination of fractionated oils or a combination of a fractionated oil and a non-fractionated oil can also be utilized. The cookware release agent and the fractionated palm oil are mixed, and the mixture is dispensed from the aerosol container by the propellant. Suitable fractionated oils include fractionated coconut oil and fractionated palm oil, such as palm olein and palm super olein. Suitable cookware release agents include phospholipids, including phosphorus-containing glycerides, such as lecithin, lysophospholipids, phosphated monoglycerides, phosphated diglycerides, and mixtures thereof. Suitable propellants include pressurized gases, such as nitrous oxide, liquefied hydrocarbons, or mixtures thereof.

6 Claims, No Drawings

SPRAYABLE COOKWARE RELEASE COMPOSITION WITH FRACTIONATED OIL AND METHOD OF PREPARING FOOD ITEM

FIELD OF THE INVENTION

The present invention relates to sprayable compositions, and more particularly, to a sprayable cookware release composition containing a fractionated oil, such as a fractionated palm oil, palm kernel oil, or coconut oil.

BACKGROUND OF THE INVENTION

Various sprayable cookware release compositions have been developed to prevent cooking surfaces, utensils or other cooking implements from sticking to food items. For example, one conventional cooking spray includes a canola oil that is mixed with a release agent. The oil that is used in conventional cooking sprays is typically an unsaturated oil that can contain significant quantities of unsaturated fatty acids, e.g., 85% or more by weight. The edible oil is used as a carrier medium, and a phospholipid functions as an anti-stick or release agent. The mixture of the oil and the release agent is dispensed by a propellant from an aerosol container, such as a gas or liquefied hydrocarbon pressurized container, or from a pump pressurized aerosol container. Other conventional cookware release compositions are in the form of a solid stick form of a lecithin. Conventional cooking sprays and anti-stick compositions, however, have a number of shortcomings.

Initially, conventional cooking sprays or compositions usually polymerize at typical cooking temperatures and durations. As a result of polymerization, sticky or viscous film-like sections are formed on the cooking wares. The polymerized composition can be difficult to remove from cooking surfaces or utensils with detergent and water.

The food item can also stick to the polymerized composition and, consequently, damage or impair the quality or appearance of the food item. Further, cooking surfaces or utensils with polymerized composition baked thereon can be difficult to clean, thereby requiring a user to spend additional time and effort cleaning the cooking surface to remove (or attempt to remove) the film. This problem can occur with both uncoated and coated surfaces. Moreover, if a coated surface, such as a Teflon® surface, is cleaned, repeated scrubbing of the coated cooking surface to remove the film can remove or scratch the Teflon® coating, thereby damaging or impairing the coated cookware. These shortcomings of conventional cooking sprays are amplified when food is cooked at higher temperatures or for longer periods of time since the degree of polymerization typically increases with higher temperature and longer cooking times.

In an attempt to address various shortcomings of conventional cooking sprays, users can reduce polymerization of the cooking spray by cooking at lower temperatures or for shorter periods of time. These options, however, place restrictions on the cooking of food using conventional cooking sprays and can present a number of health hazards due to undercooked food. Consequently, the taste and quality of the cooked food item can be impaired compared to cooking the food item at typical higher temperatures.

Further, highly unsaturated oils typically used in conventional compositions are prone to oxidation, which can add an undesirable taste to the food item being prepared. The shelf life of a sprayable cookware composition can also be improved since conventional cooking sprays using highly unsaturated oil typically have a short shelf life.

A need, therefore, exists for a sprayable cookware composition or cooking spray that eliminates or reduces polymerization by increasing the temperature at which a cooking spray begins to polymerize, delaying the time at which polymerization begins, or a combination thereof. Reducing polymerization at typical cooking temperatures and durations can prevent or reduce the polymerized film or viscous layer from forming on the cookware surface or utensil, simplify cleaning of cookware and utensils, reduce or eliminate unpleasant tastes penetrating into food items, enable users to cook food at higher temperatures or for longer periods of time, and provide a cooking spray that can be stored for longer periods of time compared to conventional cooking sprays, while still being dispensable from an aerosol container. A further need exists for a method of preparing a food item with such a composition or cooking spray.

SUMMARY OF THE INVENTION

The present invention provides a sprayable cookware release composition that can be dispensed from an aerosol container. The composition includes a cookware release agent, a fractionated oil, such as a fractionated palm, palm kernel or coconut oil, and a propellant. The cookware release agent is mixed with the fractionated oil. The mixture is then dispensed from the aerosol container by the propellant.

Also in accordance with the present invention, the release agent can be a phospholipid, such as lecithin or a variant thereof. In further accordance with the present invention, the fractionated oil can be a fractionated palm oil, such as a palm olein, a double fractionated palm oil such as a palm super olein, or a mixture of a palm olein and a palm super olein. The mixture can also include both a fractionated oil and a non-fractionated oil. Also in accordance with the present invention, the propellant used to dispense the mixture from the aerosol container can be a food-grade propellant, a pressurized gas, or a liquefied hydrocarbon. The propellant can also be a nitrous oxide, a carbon dioxide, a nitrogen, a propane, a butane, an isobutane, or a mixture thereof.

The cookware release composition can also include various additives or additional ingredients, including a food-grade viscosity reducing agent, such as ethanol and hydrocarbons with a vapor pressure of between about 15 and about 108 PSIG (Pounds per Square Inch Gauge), an anti-foaming agent, a blocking agent, a flavoring agent, a preservative, an antioxidant, an emulsifying agent, a crystallization inhibiting agent, or a food-grade coloring agent.

Also in accordance with the present invention is a method of preparing a food item with a cookware release composition. A cookware release agent having lecithin, a fractionated oil, and a propellant are provided. The release agent and the fractionated oil are mixed to form the cookware release composition. The mixture is then dispensed from the aerosol container with the propellant onto the cookware surface. A food item is applied onto the coated cookware surface and heated.

DETAILED DESCRIPTION

In the following description, reference is made to specific embodiments in which the invention may be practiced. It is to be understood that other embodiments may be utilized as changes may be made without departing from the scope of the present invention.

One embodiment of the present invention provides a cookware release composition including a release agent, a fractionated oil, and a propellant. A mixture of the release agent and the fractionated oil is dispensed from an aerosol container onto, for example, cookware surfaces or utensils, by the propellant. The composition provides a non-stick or low friction surface so that food items can be cooked on a surface coated with the composition and easily removed therefrom. Specifically, the composition does not polymerize or exhibits reduced polymerization at typical cooking temperatures and durations, thereby providing an effective anti-stick agent while permitting the food item to be properly prepared. The composition of the present invention achieves these enhancements by increasing the temperature at which polymerization of the composition begins, delaying the time at which polymerization begins, or a combination thereof. The composition of the present invention can be utilized in many different cooking applications, including baking and frying various food items.

Persons of ordinary skill in the art will recognize that different cooking temperatures and durations are suitable for different food items and cooking needs. For example, the composition of the present invention is suitable to be applied to cookware that is used to bake food items in an oven at about 350° F. to about 450° F. for about 10 to about 60 minutes. The composition of the present invention is also suitable to be applied to cookware, such as a frying pan or skillet, that is used to prepare food items (such as eggs or pancakes) at similar temperatures for about 5 to about 10 minutes. The composition of the present invention can be used to coat cooking surfaces or utensils in both exemplary cooking instances and reduces or eliminates polymerization at these exemplary typical cooking temperatures and durations. Of course, the composition of the present invention can be used with various cooking temperatures and durations and with various cookwares.

Various cookware release agents can also be utilized with the present invention. Exemplary cookware release agents include phospholipids, such as phosphorus-containing glycerides, including lecithin, lyso-phospholipids, phosphated monoglycerides, phosphated diglycerides, and mixtures thereof. Preferably, the cookware release agent includes lecithin as an anti-stick or release agent.

A cookware composition can contain various amounts of lecithin, e.g., from about 0.5% to about 50% by weight lecithin. Preferably, the cookware composition includes from about 1% to about 40% by weight lecithin, and most preferably, 3% to about 12%. Exemplary sources of lecithin that are suitable for the composition include both plant and animal sources, or a mixture thereof. For example, soybeans, corn germ, rice bran, cottonseeds, sunflower seeds, rapeseeds, canola, and egg yolks are all suitable sources of lecithin for the sprayable composition of the present invention. The lecithin component can be fluidized or deoiled. Fluidized lecithin typically contains at least 50% of acetone-insolubles, while deoiled contains at least 90%. The lecithin may further be chemically-modified by, e.g., hydroxylation and acylation. Mixtures of naturally occurring lecithin and chemically-processed lecithins, such as hydroxylated lecithin and acylated lecithin, can also be utilized. Persons of ordinary skill in the art will recognize that other cookware release agents can also be used, for example, a lyso-phospholipid, a fractionated lecithin or phospholipid, a hydrogenated lecithin, a phosphated monoglyceride, a phosphated diglyceride, or a mixture thereof.

Further, different types and combinations of fractionated oils can be utilized. Preferably, the fractionated oil is a fractionated palm oil. Other fractionated oils can also be used, for example, fractionated palm kernel and coconut oils. Fractionated palm oil, however, is discussed in further detail for purposes of explanation, but the invention is not so limited. The fractionated palm oil is at a temperature or has an amount of organic solvents so that it is free of crystals or crystal-like structures, or has a minimum or reduced amount crystals or crystal-like structures, so that the composition can be practically dispensed from an aerosol container. Fractionated palm oil is distinguished from whole palm oil since whole palm oil contains crystals or crystal-like structures that can clog a nozzle of an aerosol container. Accordingly, fractionated palm oil is advantageous since it is liquid and lacks crystals or crystal-like structures or contains reduced amounts of such crystals or crystal-like structures, thereby making it suitable to be dispensed from an aerosol container.

Persons of ordinary skill in the art, however, will appreciate that a fractionated palm oil at increased temperatures or having additional amounts of organic solvents can reduce crystal formation. Thus, a fractionated palm oil that is free of crystal structures is preferred, but a fractionated palm oil with reduced or minimum quantities of crystal structures relative to whole palm oil can also be utilized since the size of an aperture of the aerosol container can be adjusted so that a composition having a crystal-containing fractionated oil can be dispensed from the container.

In one embodiment, the cookware composition includes from about 65% to about 80% fractionated palm oil by weight, more preferably, about 77.5%. The fractionated palm oil preferably is not transesterified or is a composition having such a fractionated palm oil that does not polymerize at typical cooking temperatures and typical cooking durations. One exemplary fractionated palm oil that can be utilized is a double fractionated palm oils such as palm super olein. Other suitable fractionated palm oils, include but are not limited to, palm olein, fractionated palm kernel oil, and a mixture of palm olein and double fractionated palm oils such as palm super olein. For example, in one embodiment, the fractionated palm oil includes 41% palmitic acid, about 40% oleic acid, and 12% linoieic acid, by weight. In an alternative embodiment, the fractionated palm oil is a double fractionated palm oil and includes about 33% palmitic acid, 47% oleic acid, and about 13% linoleic acid, by weight. Indeed, various other fractionated oil compositions can be utilized. Table 1 lists typical characteristics of a typical reference non-fractionated palm oil, an exemplary palm olein fractionated oil that can be used with the composition of the present invention, and an exemplary palm super olein double fractionated palm oil that can be used with the composition of the present invention.

TABLE 1

(Based on Weight Percent of Composition)

| Fatty acid composition | Non-Fractionated (Palm Oil) | Fractionated Palm Oil (Palm Olein) | Double Fractionated Palm Oil (Palm Super Olein) |
|---|---|---|---|
| Lauric (12:0) | 0.1–0.4% | 0.2–0.4% | 0.2–0.4% |
| Myristic (14:0) | 1.0–1.4% | 0.9–1.2% | 0.9–1.1% |
| Palmitic (16:0) | 40.9–47.5% | 38.2–42.9% | 30.1–37.1% |
| Stearic (18:0) | 3.8–4.8% | 3.7–4.8% | 3.2–4.3% |
| Palmoleic (16:1) | 0–0.6% | 0.1–0.3% | 0.2–0.4% |
| Oleic (18:1) | 36.4–41.2% | 39.8–43.9% | 43.2–49.2% |
| Linoleic (18:2) | 9.2–11.6% | 10.4–12.7% | 10.7–15.0% |
| Linolenic (18:3) | 0–0.5% | 0.1–0.6% | 0.2–0.6% |
| Slip melting point, ° C. | 33.0–39.0° C. | 19.2–23.6° C. | 12.9–16.6° C. |

One exemplary manner of preparing the fractionated palm oil involves heating palm oil having an iodine value of 52.3 (weight standard, same as hereinafter) The palm oil is cooled to −20° C. Then the crystalline components are filtered from the mixture, and the components of the filtrate containing elements having a low melting point are collected. These low melting point components are then refined to produce the fractionated palm oil.

The propellant of the sprayable composition can be a food grade propellant, such as a pressurized gas, a liquefied hydrocarbon, or a mixture thereof. For example, a pressurized gas propellant can be used so that about 2% to about 8.5% by weight, more preferably from about 3% to about 5%, of the liquid components of the composition is a pressurized gas. If a liquefied hydrocarbon propellant is utilized, the composition can include from about 10% to about 75% by weight liquefied hydrocarbon. Other suitable food grade propellants include nitrous oxide, carbon dioxide, nitrogen, propane, butane, or isobutene. For example, the cookware release composition can include about 2% to about 8.5% by weight, preferably about 3% to about 5%, of nitrous oxide. Additional exemplary propellants include mixtures of nitrous oxide and minor portions of other food grade propellants. Persons of ordinary skill in the art will appreciate that other propellants can also be utilized, including but not limited to, nitrous oxide, carbon dioxide, nitrogen, propane, butane, an isobutene propellant, or a mixture thereof.

Having described the components of embodiments of the present invention, following is a summary of test results comparing various conventional cooking compositions and compositions of the present invention. The conventional compositions utilized in this test included lecithin, ethanol, and the following oils: diglyceride oils; peanut oil; liquid tallow; partially hydrogenated soybean oil; and canola oil. Two compositions of the present invention included palm olein (fractionated palm oil) and palm super olein (double fractionated oil). A third composition of the present invention included a combination of about 70% palm super olein and about 30% soybean oil (a non-fractionated oil) by weight. While various ratios of fractionated oil (e.g., palm super olein) to non-fractionated oil (e.g., soybean oil) can also be utilized, the ratio of fractionated to non-fractionated oil is preferably at least about 70:30 by weight. In the test, a 0.5 g spray of the conventional composition and a 0.5 g spray of the three exemplary compositions of the present invention were applied to test areas of a metal baking pan. The pan was baked at 425° F. for 20 minutes. After the pan cooled to room temperature, it was washed with typical soapy water and even strokes of a paper towel across the pan surface. The tests indicated that the compositions of the present invention performed better than conventional compositions and could be washed from the pan more easily than conventional compositions. The test results indicated that the conventional cookware release compositions polymerized into a film, and that the polymerized film could not be washed away with soap and water or did not wash away as easily compared to the three exemplary compositions of the present invention since they did not polymerize into a film or exhibited reduced polymerization compared to the conventional compositions.

The test results indicate a number of advantages of the compositions of the present invention compared to prior cooking sprays. First, the test results demonstrate that the compositions of the present invention either did not polymerize at the test temperature during the cooking duration or must be heated for longer periods of time at the test temperature before they begin to polymerize compared to conventional sprays. In either case, the test results indicate that for a given cooking temperature, the time at which the compositions of the present invention begin to polymerize is delayed or is extended beyond typical cooking times, thereby reducing or eliminating composition polymerization. Relatedly, for a given cooking duration, the test results indicate that the compositions of the present invention begin to polymerize at higher temperatures. Thus, the sprayable cookware release compositions of the present invention eliminate or reduce polymerization by increasing the temperature at which a cooking spray begins to polymerize, delaying the time at which polymerization begins, or a combination thereof, simplify cleaning of cookware and utensils, and enable users to cook food at higher temperatures or for longer periods of time.

The manner of manufacturing a product including an embodiment of the present invention is now described. A lecithin release agent is mixed with the fractionated palm oil component stepwise until a uniform solution is obtained. Lecithin can be heated up to about 140° F., but excessive heating can result in darkening of the lecithin. Ethyl alcohol, as well as other optional components, can be added separately at this point, or previously introduced into one or both of the other components. Optional materials which are not soluble in the resultant solution, such as the previously mentioned blocking agents, may be added with agitation continued until a uniform dispersion is obtained. The resulting blend is then filled into the container and a vacuum is drawn to purge air from the container. Alternatively, the propellant may be used to purge air from the headspace of the container. A suitable aerosol valve is then inserted and crimped into place creating an air tight pressure seal. For example, valve components, such as those manufactured by Summit Packaging Systems and Seaquist Valve Company, may be used. Nitrous oxide is then injected into the container. Hydrocarbon propellants can also be used in the manner described previously, or by utilization of under the cup gassing.

Also useful in the practice of the present invention are thin-walled aerosol containers, such as those manufactured by Dispensing Container Corporation (DCC). The "head space" or space within the aerosol container occupied by the propellant is measured relative to conventional containers so as to occupy from about 15% to about 60% of the volume of the container (when fill). With the previously described composition and container, the sprayable cookware release composition can be uniformly and effectively applied to surfaces of utensils, molds, frying pans, sauce pans, baking pans or other cooking surfaces, whether composed of metal, glass or ceramic materials. The thin coating film better permits the cooking of food items such as eggs, pancakes, muffins, cookies, and various other food items without the need to apply additional grease or fat to provide a non-stick surface. After cooking, these food items will come free from the surface with little or no removal effort. The cookware can be cleaned easily without significant scrubbing, brushing, or scouring using water with or without detergent. Preferably, the composition should be applied each time the cooking surface is utilized, however, the coating can last for multiple cooking occasions without reapplication.

The cookware release composition can optionally include various other ingredients and additives. As previously discussed, one optional additive is a non-fractionated oil. The non-fractionated oil is mixed with the release agent and the fractionated palm oil, and the mixture is dispensed by the propellant from the aerosol container. Exemplary non-fractionated oils that can be utilized include, but are not limited to, soybean oil, sunflower oil, winterized cottonseed oil, corn oil, safflower oil, peanut oil, walnut oil, grape-seed oil, olive oil, or canola oil. Mixtures of the fractionated palm oil and the non-fractionated oil are preferably at least about 70:30 by weight, as previously discussed.

The composition can also optionally include various food-grade ingredients, including but not limited to, anti-foaming agents, blocking agents, flavoring agents, preservatives, antioxidants, emulsifying agents, coloring agents, crystallization inhibiting agent, and viscosity reducing agents. For example, food grade blocking agents, which are visually directing aids and include grain and bean flours, starches, protein powder, and calcium gypsum. Such blocking agents allow the discharge spray to be more readily seen, thereby enabling the user to better direct such discharged spray in the practice of the present invention. Useful preservatives include sodium benzoate, calcium propionate, sorbic acid or salts of sorbic acid such as sodium sorbate and potassium sorbate. Preferred are sodium benzoate in an amount of from about 0.05% to about 0.1% by weight and calcium propionate in an amount of from about 0.1% to about 0.3% on the same basis. Antioxidants, may naturally occurring such as tocopherols or synthetic such as TBHQ, (which act to prevent rancidity of lipid components). Exemplary food-grade emulsifying agents that can be utilized include a monoglyceride, a diglyceride, or a combination thereof. The composition dispensed from the container can also include a crystalization inhibiting agent, such as a polyglycerol ester.

Additional optional ingredients or components include a solvent to decrease the viscosity of the lecithin/vegetable oil mixture found in the claimed composition. Preferred is the use of ethyl alcohol. Also, a hydrocarbon with a vapor pressure of between 15 and 108 PSIG may be used. Ethyl alcohol is discussed in further detail for purposes of explanation.

An exemplary ethyl alcohol that can be utilized is 190° and 200° proof, which conforms with United States Pharmacopoeia (U.S.P.) standards for Alcohol and Dehydrated Alcohol, respectively. The 190° proof to 200° proof ethanols are available from various sources, for instance, from U.S. Industrial Chemical Co. Ethanol of 200 U.S. proof degrees at 60° F. has a specific gravity of 0.79365, is 100 percent by weight of ethyl alcohol. Ethanol of 190 U.S. proof degrees at 60° F. has a specific gravity of 0.81582, is 92.423 percent by weight of alcohol and contains 7.577 percent by weight of water. The 1900 proof ethanol may be made by mixing 95 parts by volume of ethyl alcohol with 6.18 parts by volume of water. As used in the present invention, the ethyl alcohol functions as both a viscosity-lowering solvent and a clarifying agent.

In addition to the use of ethyl alcohol, ethyl alcohol denatured with a GRAS-classified food grade denaturant, such as S.D.A. 29-3, can be used in the practice of the present invention. S.D.A. 29-3 contains 99% ethyl alcohol and 1% ethyl acetate as a denaturant. Ethyl acetate is a GRAS denaturant thereby allowing the use of S.D.A. 29-3 in a food grade product such as the claimed composition.

The ethyl alcohol component may be present in amounts ranging from 0 to about 25% by weight, based upon the total weight of the liquid components. Preferably, it is present in amounts ranging from about 5 to about 25%.

A food item can be prepared with the method described below using the cookware release composition according to the present invention. Initially, a cookware release agent, a fractionated palm oil (e.g., a palm olein, a palm super olein, or a mixture thereof), and a propellant are provided. A non-fractionated oil can also be provided, if necessary. The cookware release agent and the fractionated palm oil are mixed together to form the cookware release composition. The mixture is then dispensed from the aerosol container with the propellant onto, for example, a cookware surface or mold. The food item is applied onto the coated cookware surface, and the coated cookware surface and the food item are heated to typical cooking temperatures for typical cooking durations, as previously described. Of course, persons of ordinary skill in the art will recognize that the previously recited steps can be performed in different orders. For example, the food item can be applied to the cooking surface, and then the composition can be applied to the cooking surface (and food item) and then heated.

Although references have been made in the foregoing description to various embodiments, persons of ordinary skill in the art of sprayable cooking compositions will recognize that insubstantial modifications, alterations, and substitutions can be made to the described embodiments without departing from the invention as claimed in the accompanying claims, particularly considering that a sprayable composition with a fractionated palm oil can include various other ingredients, and the composition can be used with many different cookware surfaces and food items. For example, various types of fractionated oils, fractionated palm oils, combinations of fractionated oils, and combinations of fractionated and non-fractionated oils can be utilized in a composition according to the present invention.

What is claimed is:

1. A cookware release composition suitable for dispensing from an aerosol container, comprising:

a cookware release agent;

a fractionated oil;

a propellant;

a non-fractionated oil, wherein a mixture of said cookware release agent, said non-fractionated oil, and said fractionated oil is dispensed from the aerosol container by said propellant and a ratio of said fractionated oil to said non-fractionated oil in said mixture is at least about 70:30 by weight; and a food-grade blocking agent, wherein said mixture dispensed from the aerosol container includes said food-grade blocking agent, and the blocking agent comprises a flour.

2. The cookware release composition of claim 1, wherein the flour is a grain flour.

3. The cookware release composition of claim 1, wherein the flour is a bean flour.

4. A cookware release composition suitable for dispensing from an aerosol container, comprising:

a cookware release agent;

a fractionated oil;

a propellant, wherein a mixture of said cookware release agent and said fractionated oil is dispensed from the aerosol container by said propellant; and a food grade-blocking agent, wherein said mixture dispensed from the aerosol container includes said food-grade blocking agent, and the blocking agent comprises a flour.

5. The cookware release composition of claim 4, wherein the flour is a grain flour.

6. The cookware release composition of claim 4, wherein the flour is a bean flour.

* * * * *